United States Patent Office 3,122,551
Patented Feb. 25, 1964

3,122,551
N-ALKYL AND N-ARALKYL BENZOXA-
CYCLOALKANEAMIDES
Harold Elmer Zaugg, Lake Forest, Robert William
De Net, Waukegan, and Raymond John Michaels, Jr.,
Mundelein, Ill., assignors to Abbott Laboratories, North
Chicago, Ill., a corporation of Illinois
No Drawing. Filed Nov. 5, 1962, Ser. No. 235,507
17 Claims. (Cl. 260—268)

This invention relates to new compounds of the formula

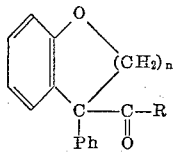

and methods for their preparation. In this and succeeding formulas, Ph is phenyl, n is 1, 2 or 3 and R is amino, loweralkylamino, diloweralkylamino, morpholino, pyrrolidino, benzylamino, cycloalkylamino containing from 3 to 7 carbon atoms or 1-methyl-4-piperazino. The term "loweralkyl" refers to methyl, ethyl, propyl and butyl. These compounds are extremely useful as intermediates. In such use, they can be refluxed with lithium aluminum hydride in ether to reduce the carbonyl group and form the corresponding benzoxacycloalkanemethylamines which are valuable analgesics and hypotensive agents. For example, an intravenous injection of an aqueous, saline solution of N-cyclopropyl-2,3-dihydro-3-phenyl-benzofuranmethylamine in cats at a dosage of 25 mg. per kg. of body weight produces an immediate marked drop in blood pressure. In addition, the compound wherein n is 3 and R is 1-methyl-4-piperazino is an active analgesic.

The new compounds can be prepared by the reaction of a substituted benzofuranone of the formula

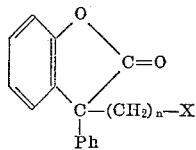

wherein X is chlorine or bromine (perferably bromine) with ammonia, a loweralkylamine, diloweralkylamine, cycloalkylamine, morpholine, pyrrolidine, benzylamine or 1-methylpiperazine. The reaction can be carried out from 0° to 35° C. in the absence of a solvent provided a stoichiometric excess of the amine or ammonia is employed as the hydrohalide acceptor. In a preferred method of operation, a solution of one molecular proportion of the bromo-substituted benzofuranone and at least two molecular proportions of the amine or ammonia in an inert, organic solvent such as benzene, cyclohexane, ethyl ether, tetrahydrofuran or acetonitrile is allowed to stand at about room temperature for 2 to 6 days. The precipitate which forms is removed by filtration and the filtrate is extracted with a dilute, aqueous acid solution. The organic solvent layer is separated and concentrated to dryness. The residual oil is then recrystallized from a suitable organic solvent such as ethanol to obtain the desired amide product as a crystalline solid.

The examples which follow are intended to illustrate rather than limit the invention.

EXAMPLE 1

N-n-Propyl-2,3-Dihydro-3-Phenylbenzofuran-3-
Carboxamide

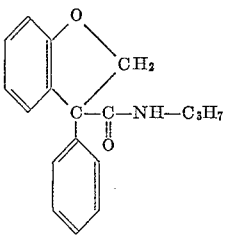

A solution of 90.0 grams (0.3 mole) of 3-brommethyl-3-phenyl-2-benzofuranone and 53.1 grams (0.9 mole) of n-propylamine in 500 ml. of benzene was allowed to stand at room temperature for 2 days. The precipitate which formed was separated by filtration and the benzene filtrate was extracted with 200 ml. of a 10% aqueous hydrochloride acid solution. The organic solvent layer was separated and concentrated to dryness under reduced pressure. The resulting oil was then crystallized from ethanol to obtain the desired carboxamide product which melted at 111°–112° C. The yield was 46%. N (calculated)=4.98%; N (found)=5.09%.

EXAMPLES 2–8

The reaction of 3-bromomethyl-3-phenyl-2-benzofuranone with ammonia, cyclopropylamine, cyclobutylamine, n-butylamine, cyclopentylamine, cyclohexylamine or cycloheptylamine as described in Example 1 resulted in the formation of the following compounds, respectively:

2,3-dihydro-3-phenylbenzofurancarboxamide melting at 158°–159° C.;
N - cyclopropyl-2,3-dihydro-3-phenylbenzofuran-3-carboxamide melting at 133°–134° C.;
N - cyclobutyl - 2,3 - dihydro-3-phenylbenzofuran-3-carboxamide melting at 153°–154° C.;
N - n - butyl - 2,3-dihydro-3-phenylbenzofuran-3-carboxamide melting at 109°–110° C.;
N - cyclopentyl-2,3-dihydro-3-phenylbenzofuran-3-carboxamide melting at 170°–171° C.;
N - cyclohexyl - 2,3-dihydro-3-phenylbenzofuran-3-carboxamide melting at 189°–190° C.; and
N - cycloheptyl-2,3-dihydro-3-phenylbenzofuran-3-carboxamide melting at 151°–152° C.

In a similar manner, the substitution of a diloweralkylamine, morpholine, pyrrolidone, 1-methylpiperazine, methylamine, ethylamine or benzylamine for the n-propylamine of Example 1 will produce the corresponding R - substituted-2,3-dihydro-3-phenylbenzofuran-3-carboxamides, respectively.

EXAMPLES 9–14

The reaction of 3-(β-bromoethyl)-3-phenyl-2-benzofuranone or 3-(β-chloroethyl)-3-phenyl-2-benzofuranone with ammonia, cyclopropylamine, cyclobutylamine, n-butylamine, cyclohexylamine or benzylamine in the absence or presence of an inert, organic solvent according to the procedures previously described results in the formation of the following compounds, respectively:

4-phenyl-4-chromancarboxamide melting at 180°–182° C.;

N-cyclopropyl-4-phenyl-4-chromancarboxamide having a molecular weight of 293;

N-cyclobutyl-4-phenyl-4-chromancarboxamide melting at 140°–141° C.;

N-n-butyl-4-phenyl-4-chromancarboxamide having a molecular weight of 309;

N-cyclohexyl-4-phenyl-4-chromancarboxamide melting at 85°–87° C.; and

N-benzyl-4-phenyl-4-chromancarboxamide melting at 87°–88° C.

In like manner, the reaction of 3-(β-bromoethyl)-3-phenyl-2-benzofuranone with methylamine, ethylamine, dimethylamine, diethylamine, dipropylamine, dibutylamine, morpholine, pyrrolidine, 1-methylpiperazine, propylamine, cyclopentylamine or cycloheptylamine will produce the corresponding R-substituted-4-phenyl-4-chromancarboxamides, respectively.

EXAMPLES 15–16

The reaction of 3-(γ-bromopropyl)-3-phenyl-2-benzofuranone with ammonia or 1-methylpiperazine according to the procedure of the previous examples resulted in the formation of the corresponding 5-phenyl-2,3,4,5-tetrahydro-1-benzoxepin-5-carboxamide melting at 155° C. and the 1-methyl-4-(5-phenyl-2,3,4,5-tetrahydro-1-benzoxepin-5-carbonyl)-piperazine melting at 166° C., respectively.

The substituted benzofuranones employed as one of the reactants in the present invention are known compounds and their preparation is described in the Journal of Organic Chemistry, 26, 4821 (1961).

What is claimed is:
1. A compound of the formula

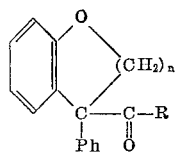

wherein Ph is phenyl, $n$ is a number from 1 to 3 inclusive, and R is a member of the group consisting of amino, loweralkylamino, diloweralkylamino, cycloalkylamino, benzylamino, morpholino, pyrrolidino and 1-methyl-4-piperazino.

2. 2,3-dihydro-3-phenylbenzofurancarboxamide.

3. N - n - propyl-2,3-dihydro-3-phenylbenzofuran-3-carboxamide.

4. N - cyclopropyl - 2,3 - dihydro-3-phenylbenzofuran-3-carboxamide.

5. N - cyclobutyl - 2,3 - dihydro-3-phenylbenzofuran-3-carboxamide.

6. N - n - butyl - 2,3 - dihydro-3-phenylbenzofuran-3-carboxamide.

7. N - cyclopentyl-2,3-dihydro-3-phenylbenzofuran-3-carboxamide.

8. N - cyclohexyl - 2,3 - dihydro-3-phenylbenzofuran-3-carboxamide.

9. N - cycloheptyl - 2,3 - dihydro-3-phenylbenzofuran-3-carboxamide.

10. 4-phenyl-4-chromancarboxamide.

11. N-cyclopropyl-4-phenyl-4-chromancarboxamide.

12. N-cyclobutyl-4-phenyl-4-chromancarboxamide.

13. N-n-butyl-4-phenyl-4-chromancarboxamide.

14. N-cyclohexyl-4-phenyl-4-chromancarboxamide.

15. N-benzyl-4-phenyl-4-chromancarboxamide.

16. 5 - phenyl - 2,3,4,5 - tetrahydro-1-benzoxepin-5-carboxamide.

17. 1 - methyl - 4 - (5 - phenyl-2,3,4,5-tetrahydro-1-benzoxepin-5-carbonyl)-piperazine.

No references cited.